United States Patent
Edwards et al.

(10) Patent No.: US 7,830,384 B1
(45) Date of Patent: Nov. 9, 2010

(54) ANIMATING GRAPHICAL OBJECTS USING INPUT VIDEO

(75) Inventors: Gareth Edwards, Kerridge (GB); Kevin Walker, Sheffield (GB)

(73) Assignee: Image Metrics Limited, Manchester (GB)

( * ) Notice: Subject to any disclaimer, the term of this patent is extended or adjusted under 35 U.S.C. 154(b) by 836 days.

(21) Appl. No.: 11/406,890

(22) Filed: Apr. 19, 2006

Related U.S. Application Data

(60) Provisional application No. 60/675,251, filed on Apr. 27, 2005.

(51) Int. Cl.
*G06T 13/00* (2006.01)
(52) U.S. Cl. .................... 345/473; 345/475
(58) Field of Classification Search ............ 345/473, 345/475
See application file for complete search history.

(56) References Cited

U.S. PATENT DOCUMENTS

| | | | | |
|---|---|---|---|---|
| 5,692,117 | A * | 11/1997 | Berend et al. | 345/475 |
| 6,072,496 | A * | 6/2000 | Guenter et al. | 345/419 |
| 6,163,322 | A * | 12/2000 | LaChapelle | 345/473 |
| 7,027,054 | B1 * | 4/2006 | Cheiky et al. | 345/473 |
| 2003/0020718 | A1 * | 1/2003 | Marshall et al. | 345/474 |
| 2005/0190962 | A1 * | 9/2005 | Liu et al. | 345/420 |
| 2005/0207617 | A1 * | 9/2005 | Sarnoff | 382/103 |
| 2006/0071934 | A1 * | 4/2006 | Sagar et al. | 345/473 |
| 2009/0066700 | A1 * | 3/2009 | Harding et al. | 345/473 |

OTHER PUBLICATIONS

Tagle, J. et al., "Actor-driven Facial Animation using Blendshape Interpolation", ICS University of the Philippines Los Banos, p. 1-7, 2007.*

* cited by examiner

*Primary Examiner*—Chante Harrison
(74) *Attorney, Agent, or Firm*—Sunstein Kann Murphy & Timbers LLP

(57) ABSTRACT

A method and system for driving a graphical object based on a performance of an actor in a video stream. A plurality of key frames are selected in a calibration video stream, allowing animation control values to be defined, in accordance with artistic intent, for each of a set of control variables, corresponding to each of the key frames. Features of the actor in the calibration video stream are parameterized so as to obtain a vector of values of parameters for each frame of the calibration video stream, and, then, an array of distance vectors is derived, characterizing a distance between each pair of vectors of values of parameters among the video stream frames. The space of distance vectors is mapped into the set of control variables according to a mapping operation which is then applied to distance vectors derived from an actual performance video stream to obtain a time sequence of animation control values. Finally, an animation is created on the basis of applying the sequence of animation control values to the graphical object.

3 Claims, 2 Drawing Sheets

ANIMATING GRAPHICAL OBJECTS USING INPUT VIDEO

The present application claims priority from U.S. Provisional Patent Application Ser. No. 60/675,251, filed Apr. 27, 2005, which is incorporated herein by reference in its entirety.

TECHNICAL FIELD

The invention relates generally to the methods for deriving control parameters for a digital graphical object based on performance of an actor in a video stream.

BACKGROUND ART

Computer artists often create parameterized graphical objects for use in computer-generated material in films, television, computer games or other medium. An example is a digital 3D character (such as Shrek®), which digital 3D character is built using specialist software tools for 3D model creation. Most 3D characters are built with the intention of animation—that is, moving and deforming them in time. Manually recreating a digital 3D model for every frame of an animation would be impractical, so 3D artists build characters (or other models) with sets of controls. For the purposes of animation, the animator can set the controls to particular values and the computer modeling software will position and/or deform the 3D model according to whatever the artist intended each control to change. The controls usually have easily interpreted meanings, so for example, there may be a control to 'raise the left eyebrow'; by changing the value of the control the animator can set the position of the eyebrow on the 3D model. Sometimes controls have more general effects such as 'look happy' which might change the entire character. A character can typically have anything between ten and several hundred controls.

The process of computer animation involves setting the controls to suitable values at each frame of the animation. Even though using controls is easier than rebuilding a complete model it is still impractical to set the control values for every single frame; animators usually set the control values for a much smaller number of selected 'key frames' and allow the animation software to apply various interpolation techniques to 'fill in' the values in the frames in-between.

Often, the desired animation may have something in common with the appearance or movement of an object in the real world. For example, although Shrek® or Mickey Mouse® are fantasy characters, the way they appear and the way they move when they speak or express themselves has something in common with the way real human beings look even if that commonality is extremely exaggerated or deformed and can be difficult to put into words. An extreme example is where fantasy characters' eyes can literally 'pop out of their heads' to express surprise—this is actually the artist's stylistic exaggeration of a real person's 'wide eyes' when surprised. A key part of an animator's creativity is to define the behavior of the character with respect to expression and speech.

SUMMARY OF THE INVENTION

In accordance with preferred embodiments of the present invention, methods and computer program codes are provided for driving a graphical object based on a performance of a character in a video stream. In accordance with one method, the following steps are provided:

a. selecting a number of key frames in a calibration video stream;

b. defining animation control values, in accordance with artistic intent, for each of a set of control variables, corresponding to each of the key frames;

c. parameterizing features of the actor in the calibration video stream so as to obtain a vector of values of parameters for each frame of the calibration video stream;

d. deriving an array of distance vectors characterizing a distance between each pair of vectors of values of parameters among the video stream frames, the distance vectors defining a space;

e. mapping the space of distance vectors into the set of control variables according to a mapping operation;

f. applying the mapping operation to distance vectors derived from an actual performance video stream to obtain a time sequence of animation control values; and g. creating an animation based on applying the sequence of animation control values to the graphical object.

In accordance with other embodiments of the invention, the mapping operation may be a matrix of regression coefficients. The actual performance video stream may also be identical to the calibration video stream.

In another aspect of the invention, a program storage device readable by a machine is provided, tangibly embodying a program of instructions executable by the machine to perform a method for driving a graphical object based on a performance of an actor in a video stream. The method that is performed has steps of:

a. selecting a number of key frames in a calibration video stream;

b. defining animation control values, in accordance with artistic intent, for each of a set of control variables, corresponding to each of the key frames;

c. parameterizing features of the actor in the calibration video stream so as to obtain a vector of values of parameters for each frame of the calibration video stream;

d. deriving an array of distance vectors characterizing a distance between each pair of vectors of values of parameters among the video stream frames, the distance vectors defining a space;

e. mapping the space of distance vectors into the set of control variables according to a mapping operation;

f. applying the mapping operation to distance vectors derived from an actual performance video stream to obtain a time sequence of animation control values; and g. creating an animation based on applying the sequence of animation control values to the graphical object.

A computer program product is provided, in accordance with yet a further aspect of the invention, for use on a computer system for driving a graphical object based on a performance of a character in a video stream. The computer program product has a computer usable medium with computer readable program code thereon, particularly:

a. program code for defining animation control values, in accordance with artistic intent, for each of a set of control variables, corresponding to each of a plurality of selected key frames in a calibration video stream;

b. program code for deriving an array of distance vectors characterizing a distance between each pair of vectors of values of parameters among the video stream frames, the distance vectors defining a space;

c. program code for mapping the space of distance vectors into the set of control variables according to a mapping operation;

d. program code for applying the mapping operation to distance vectors derived from an actual performance video stream to obtain a time sequence of animation control values; and e. program code for creating an animation based on applying the sequence of animation control values to the graphical object.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
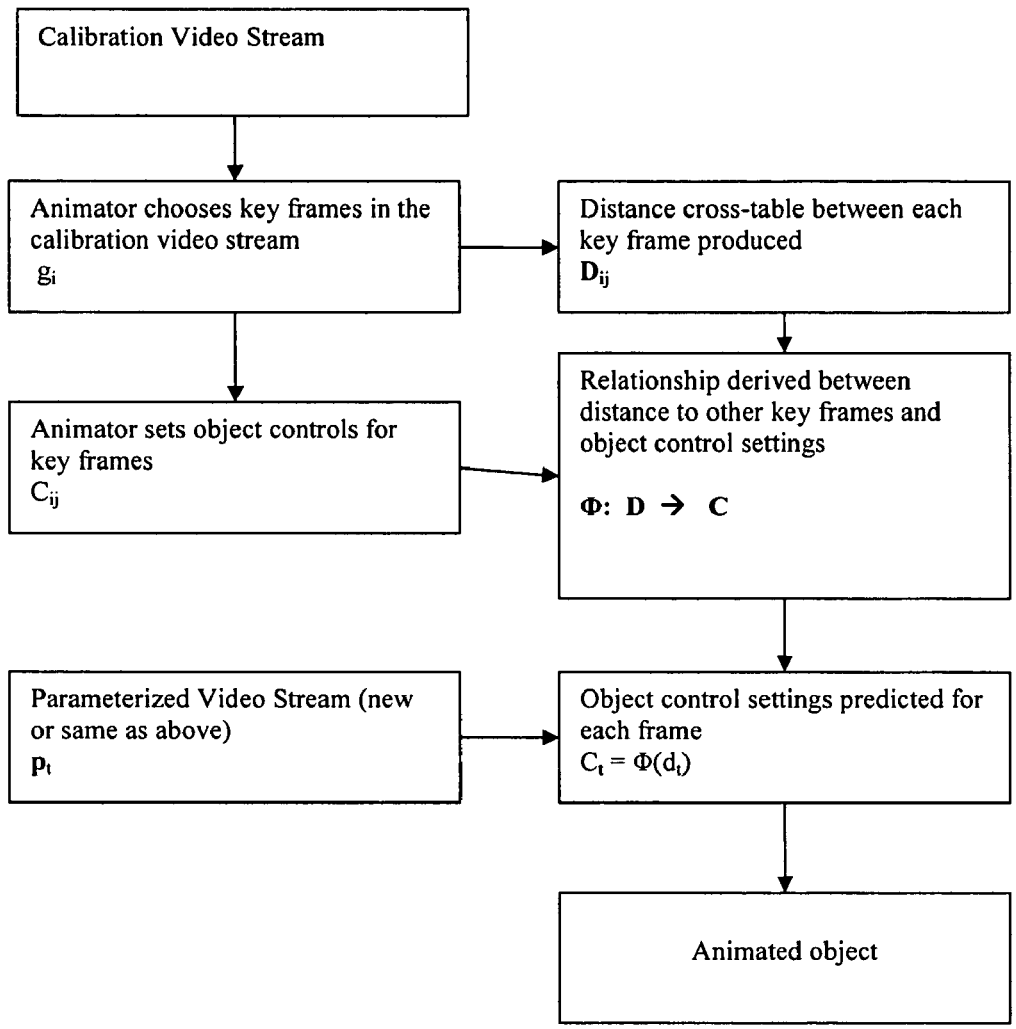
FIG. 1 is a flow chart depicting an application of preferred embodiments of the invention to derive and apply animation control values for animation of a graphical object.

In accordance with preferred embodiments of the present invention, a process is provided whereby an animator may advantageously define the behavior of a digital object (e.g. a 3D character) in correspondence with the appearance of a real life object appearing in video (and, thus, as a particular visual depiction of the real life object, which may be an actor) and then use the resulting framework to automatically animate the 3D object such that its behavior is 'driven' by the real-life video, however the way in which it appears is defined by the animator's creativity. The animator sets up the behavior by defining a selection of correspondences between frames in the real-life video and the desired appearance of the 3D object. The system then automatically animates the character. The process allows the animator to create animation with much less effort than by traditional methods, whilst still leaving him or her in full artistic control.

1. Calibration

An animator typically has a digital object (e.g. a 3D character) which has been previously created with a set of 'controls'. Any set of controls employed, such as 'morph targets' or 'bone positions', for example, or any other type, are within the scope of the present invention.

Where a particular control has more than one degree of freedom (e.g. eyes can move in several directions but might be represented on one control) the system, in accordance with the present invention, treats each degree of freedom (e.g. left/right, up/down) as a separate control. This way, any position of the object can be represented by a set of control values which can be expressed as a vector, c, where:

$$c=\{c_1, c_2, \ldots c_n\}$$

where n is the number of controls after breaking down any multidimensional controls into their individual parts.

The animator then chooses a video sequence of a human actor, for example, performing in way that he would like to be transferred to the digital object. The video sequence of the human actor is referred to herein as a "calibration video." The animator chooses several key 'calibration' frames in the video sequence and the system records the frame numbers of these frames in a vector, g, where:

$$g=\{g_1, g_2, \ldots g_k\}$$

where k is the number of key calibration frames.

The animator then chooses a set of control values for the digital object at each key calibration frame. So, for example, at calibration frame number 2, the real human actor may have his left eye open (amongst other things). Typically, the animator would ensure that whatever element of the control vector, c, corresponded to the digital character's left eye was set to a value which meant 'open', as well as setting the other elements to values appropriate to whatever the actor was doing in the frame. Note however that the animator has complete artistic freedom and could choose to make the eye close, or more likely, 'pop out of the characters head' in correspondence with this position of the actor's eye. These control settings are recorded for each calibration frame, producing a k×n matrix of calibration settings, C.

$$C=\{C_{1,1} C_{1,2} \ldots c_{1,n} \ldots \ldots c_{k,n}\}$$

2. Relating a Parameterized Video Stream to the Digital Object

Training Phase

In accordance with the invention, the video stream of the actor is first processed to extract a stream of parameter vectors, p, for each frame, where the parameter vector contains elements that describe a set of parameters such as the shape, or the shape and texture, of the real-world object in the video stream. While the present invention is not dependent on any particular parameterization, we have found it effective to use a parameterization based on the positions of 'landmark' points on the real-world object in the video, together with 'shape-normalized' texture.

Figure 2:
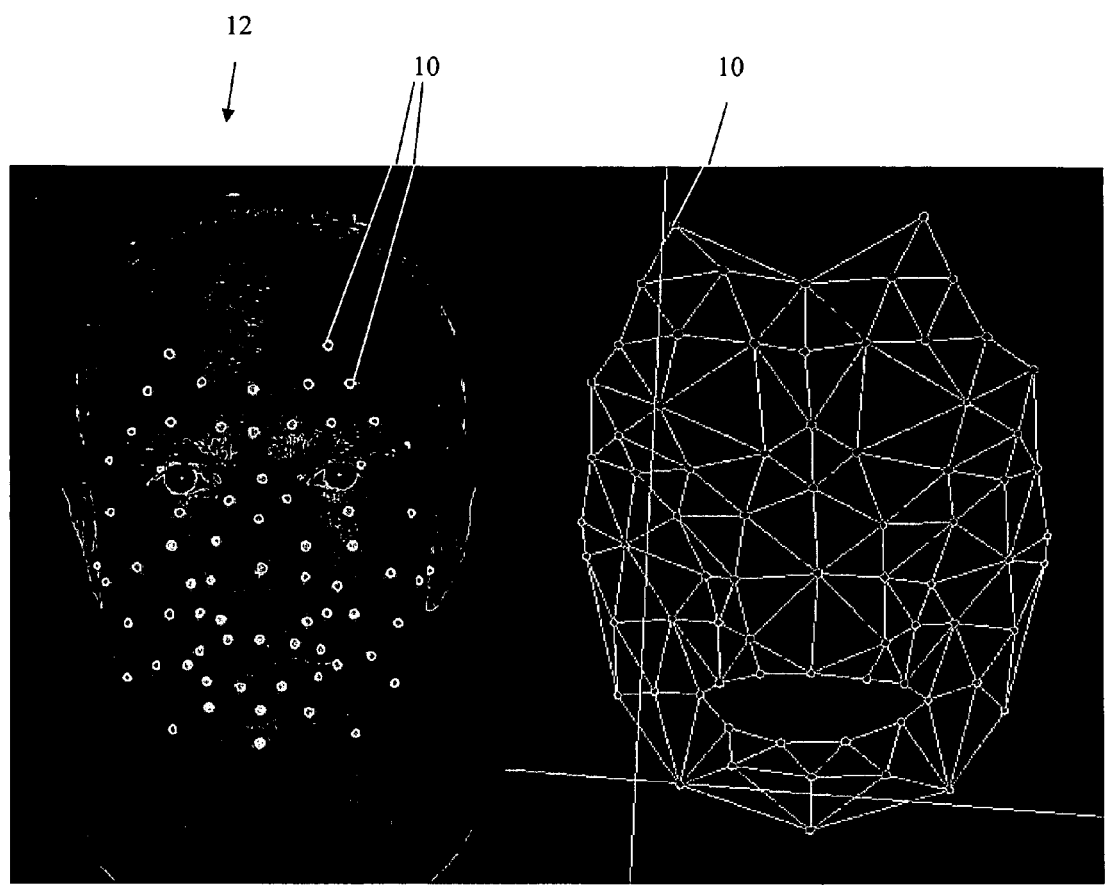
FIG. 2 depicts a typical set of landmarks defined on the face of an actor for application of the invention.

For example, if the video is of a human face (such that the real-world object is a face), the position of key points, such as the corners of the eyes, is marked in each frame of the video. Typically, 50 tracking points 10 on a human face 12, as shown in FIG. 2, might be used in each frame of the video. Various software tools are known for automatically tracking points through video rather than marking each frame by hand, but, for the purpose of this system, it does not matter how the tracking is achieved.

The positions of these tracking points can also be used to extract pixel values from regions defined by the points. For example, if points surrounding the eye are tracked then the pixel values inside the eye can be extracted from each frame. It is then possible to construct a parameterization of either or both landmark positions and pixel values such that each frame can be described by a set of parameters, p. The values of each element of p will change according to the shape and texture of the object in the video.

Thus, a vector $p_f$ is obtained for every frame, f, in the video sequence. A matrix, P, is constructed by vertically concatenating a subset of the $p_f$ vectors corresponding to the calibration frames:

$$P=\{p_{g1} p_{g2} \ldots p_{gk}\}$$

The system then computes the 'distance' between each pair of rows of P. Various definition of distance can be used, but for most examples, and as long as the parameters are measured on similar scales, a Euclidean distance, $D_{ij}$ can be used where i and j are respective rows of P.

This creates a k×k distance matrix, D, where each element of D gives the distance between the video parameter vectors i and j. D is now transformed so that the mean value of each row is subtracted from each element of the corresponding row.

Each row of the transformed D now represents the distance (with the mean distance subtracted) between the parameterization, p, for a particular calibration example, $g_i$, and all the other calibration examples, $g_1 \ldots g_k$.

Recall, a vector $p_f$ of shape/texture parameters has been derived for every frame, f, in the video sequence.

We now seek to derive a relationship between the vectors describing the digital object, c, and the distance between the corresponding video parameters, p, for the chosen frame and the video parameters for all other frames: We seek a relationship of the form:

$$c = \Phi(d),$$

where c is the digital character control vector, and d is a vector of distance between the video parameters, p, for the chosen frame and the video parameters for all other frames. There are many potential choices for the form of the vector function $\Phi$, but for most purposes a simple multivariate linear regression is sufficient and thus the solution takes the form:

$$c = Ad$$

where A is a matrix of regression coefficients. A is computed by standard multivariate regression between the matrices C and D.

In the general case, $\Phi$ is an operator that maps a space spanned by the distance vectors into a space spanned by the digital character control vectors, and the construction that has been described in accordance with the invention provides that $\Phi$ is a function, mapping D to C, one-to-one.

3. Animating the Digital Object from a Parameterized Video Stream

Runtime Phase

A video stream parameterized in the same way as the calibration video can be now used to 'drive' the digital object. In some circumstances the same video stream is used for both calibration and driving though this is not essential.

Each frame, t, of the input sequence is represented by a vector of video parameters, $p_t$. The system then computes a vector of distances $d_t$, by comparing $p_t$ with each row of P in turn.

The predicted digital object control settings are then predicted according to:

$$c_t = \Phi(d_t)$$

In the specific case of linear regression this is:

$$c_t = Ad_t$$

Thus for every frame in the video sequence a set of character control settings are predicted whose values are driven by the video, but in accordance with the animator's artistic intention as defined by his or her choice of calibration. The time sequence of frames in the original video sequence thus results in a time sequence of animation control values.

4. Alternative Embodiments

If there are a large number of character controls it can be necessary to set a large number of calibration example frames to obtain good results. This can be avoided by splitting the task into separate parts. For the example of a character's face this might be 'eye', 'mouth', etc. Each part is animated separately by breaking the vector, c, into a smaller number of subvectors and using different parameterizations of the video for each subvector (for example, if only driving the eyes, we might only parameterize the eye region in the video). The animation is conducted exactly according the method described above and the individual results recombined at the end.

The described embodiments of the invention are intended to be merely exemplary and numerous variations and modifications will be apparent to those skilled in the art. For example, the video stream need not be of 'real-life' footage; exactly the same methods describe may also be applied in a circumstance wherein an existing animation is used as the video stream and it is applied animate a new character. All such variations and modifications are intended to be within the scope of the present invention as defined in the appended claims.

We claim:

1. A method for driving a graphical object in computer-generated material in film, television and computer games based on a performance of an actor in an actual performance video stream, the method comprising:
   a. selecting a plurality of key calibration frames in a calibration video stream to serve as a basis set of frames specific to the actor and the graphical object;
   b. defining animation control values, in accordance with artistic intent, for each of a set of control variables, corresponding to each of the key calibration frames;
   c. parameterizing features of the actor in the calibration video stream so as to obtain a vector of values of parameters for each frame of the calibration video stream;
   d. deriving, for each key calibration frame, a vector containing a distance to all of the key calibration frames;
   e. for each frame in the video stream, deriving a vector containing, as elements, distances to all of the basis set of key calibration frames;
   f. mapping the space of distance vectors into the set of control variables according to a mapping operation;
   g. applying the mapping operation to distance vectors derived from the actual performance video stream to obtain a time sequence of animation control values; and
   h. creating the graphical object embodying a particular visual depiction of the actor based on applying the sequence of animation control values to the graphical object.

2. A method in accordance with claim 1, wherein the mapping operation is a matrix of regression coefficients.

3. A method in accordance with claim 1, wherein the actual performance video stream is identical to the calibration video stream.

\* \* \* \* \*